United States Patent Office 3,135,810
Patented June 2, 1964

3,135,810
PRODUCTION OF ACETYLENE
Frederick H. Belden, New York, N.Y., William W. McManus, Brownsville, Tex., and Wilburn H. Hoffman, South Charleston, W. Va., assignors to Union Carbide Corporation, a corporation of New York
No Drawing. Filed Mar. 23, 1961, Ser. No. 97,713
14 Claims. (Cl. 260—679)

The present invention relates to an improved process for the production of acetylene by partial oxidation of saturated hydrocarbons, such as methane, and is a continuation-in-part of our pending application, Serial No. 734,116, filed May 9, 1958.

Heretofore, many systems have been proposed for the production of acetylene by partial oxidation of hydrocarbons, but these processes do not give desirable large-volume, high-percentage yields of acetylene together with long periods of trouble-free continous operation.

In one process, a non-stoichiometric (insufficient oxygen for complete combustion) mixture of preheated saturated hydrocarbon gas (natural gas) and oxygen is passed through a multi-opening plate and there ignited to utilize the plate to prevent striking back of the flame to the mixing section. The hot combustion products containing acetylene are rapidly quenched in water and the acetylene is removed from the other combustion products. This process employs a gas flow rate during mixing of approximately 300 feet per second and is fraught with operating difficulties, such as preignition reactions.

It has been found that to obtain high yields in a partial oxidation acetylene production process, it is imperative that certain essential requirements are met. These requirements are: (1) both the hydrocarbon and oxidant should be preheated prior to mixing to as high a temperature as possible without causing preignition during mixing; (2) if premixing is used, intimate mixing of the preheated hydrocarbon and preheated oxidant should be effected in as short a time interval as possible to prevent preignitions at the mixing point and to minimize preheat loss; and (3) the partial oxidation reaction of methane or other hydrocarbons to form acetylene should be effected in a relatively short time interval and at as high a temperature as possible to maintain high acetylene yields.

More specifically, for a given mixture of reactants, the percentage of acetylene in the product has been found to be greatly affected by the temperature to which the reactants are heated, since the volume of acetylene produced is favored by high temperature. In known processes the extent of the preheating to be effected is limited for practical reasons to a maximum temperature that will not result in excessive preignitions at the mixing point. Should the oxidant stream be preheated to too high a temperature, substantial oxidation of the interior of the metal oxidant conduits would occur. Should the hydrocarbon be preheated to too high a temperature, substantial pyrolysis would occur to cause harmful carbon deposits on the walls of the apparatus and result in plugging of the preheater tubes.

The above-mentioned rapid and intimate mixing of preheated hydrocarbon and preheated oxidant at the highest practical temperature is required for high yields of acetylene in the reaction products. This is required, among other reasons, to minimize the loss of some pre-heat through the apparatus walls which occurs during mixing if the mixer is cooled by water or other coolant.

Preignition reactions give rise to many serious problems. When such reactions occur, the yield of acetylene from a given amount of the reactants is substantially reduced. Not only is there a loss in the amount of acetylene produced, but preignition reactions also destroy the component parts of the acetylene burner. For these reasons, in a process for the production of acetylene by a partial oxidation reaction, it is of the utmost importance that preigniation reactions be substantially eliminated or diminished.

One method employed to prevent the occurrence of preignition reactions has been to reduce to preheat temperatures of the hydrocarbon and oxidant streams. However, this has not proved to be satisfactory since the amount of acetylene produced from a given amount of reactants decreases when the preheat temperature of the hydrocarbon and oxidant streams is decreased.

Accordingly, the primary object of the present invention is to provide an improved process for the production of acetylene wherein preignition reactions are minimized without a corresponding reduction in the acetylene yield.

Another object of the present invention is to provide a process for the production of acetylene which enables the use of a greater preheat temperature of the reactants than heretofore possible, without increasing the danger of preignition reactions, thereby increasing the yield of acetylene from a given amount of reactants.

In accordance with the present invention, an improvement is provided in the process for production of acetylene by partial oxidation of a hydrocarbon feed stock consisting substantially of saturated hydrocarbon, wherein a preheated stream of the hydrocarbon feed stock and a preheated stream of oxidant are admixed in a mixing zone and the combined streams passed into a reaction zone wherein the partial oxidation is effected. The improvement comprises introducing into the hydrocarbon feed stock, prior to mixing the hydrocarbon feed stock and oxidant, a preignition inhibitor in concentration of from about 0.1 percent to about 20 percent by volume of the hydrocarbon feed stock, the preignition inhibitor comprising at least one member selected from the group consisting of air, oxygen, oxygen-enriched air and steam, whereby preignition of the mixture, prior to partial oxidation in the reaction zone, is diminished.

Preignition reactions are caused by certain reaction-inducing materials carried in the hydrocarbon stream. Examples of such reaction-inducing materials are carbon, iron rust and free hydrocarbon radicals. Although, the rate at which preignition reactions occur is a measurable indication of the effectiveness of preignition inhibitors, the actual inhibition mechanism is not completely understood. It is believed that the inhibitors either destroy free hydrocarbon radicals which are capable of inducing premature reactions and/or convert certain reaction-inducing materials to an inactive state.

In carrying out the process of the present invention, it has been found that air, commercially pure oxygen, oxygen-enriched air and steam are useful preignition inhibitors. The quantity of inhibitor added to the hydrocarbon stream should be sufficient to convert the reaction-inducing materials to an inactive state. Employing a hydrocarbon stream consisting of substantially pure methane, it has been found that a preignition inhibitor concentration of from about 0.1 to about 5 percent by volume of the hydrocarbon feed stock yields excellent results but that additional preignition inhibitor in concentrations up to about 20 percent by volume of the hydrocarbon feed stock may be added without harmful effects or excessive attenuation of the acetylene yield.

Although, it has been found that preignition inhibitors may be introduced into the hydrocarbon stream at any convenient point prior to the mixing zone wherein the hydrocarbon and oxidant are mixed, it is preferred to introduce the inhibitor prior to the preheating of the hydrocarbon stream. This assures sufficient time for the inhibitor to convert the reaction-inducing materials to an inactive state. In a particular set of circumstances, the most effective preignition inhibitor introduction point will be readily ascertainable by those familiar with the art.

Prior to the use of preignition inhibitors in accordance with the invention, a substantially pure methane stream was preheated to about 500° C. Simultaneously, an oxidant stream was preheated to about 450° C. When the preheated methane and preheated oxidant were admixed, preignition reactions occurred, in the mixing zone, on an average of about every 11 hours. A further increase in the temperature of the methane and oxidant streams would result in more frequent preignition reactions. By a substantially pure methane stream is meant one wherein there is at least about 98 percent methane.

Subsequently, preignition inhibitors were added, in accordance with the invention, to a substantially pure methane stream prior to admixing the methane and oxidant streams. The preheat temperature of the methane stream was increased to about 750° C., while the preheat temperature of the oxidant stream was increased to about 650° C. When the preheated methane and preheated oxidant were admixed, preignition reactions occurred, in the mixing zone, on an average of about every 36 hours.

In an example of the present invention, atmospheric air was introduced into the methane supply header in the ratio of 1 cubic foot of atmospheric air per 80 cubic feet of methane. The methane and oxygen streams were then preheated to a temperature of 750° C. and 650° C., respectively. Subsequently, the methane and the oxygen streams were passed to a mixing zone and thence to an internal combustion chamber where the partial oxidation reaction was effected. The introduction of atmospheric air into the methane stream enabled the operation to be carried out at about 250° C. higher than is possible without its use. Also, a substantial average increase of about 25 hours in trouble-free operation was obtained and the product contained about 0.4 percent more acetylene than was produced from a comparable amount of the same reactants under prior conditions.

In another example of the invention, commercially pure oxygen was introduced into the methane supply header in the ratio of 1 cubic foot of oxygen per 125 cubic feet of methane. The methane and oxygen streams were preheated to a temperature of 800° C. and 650° C., respectively. Subsequently, the methane and the oxygen streams were passed to a mixing zone and thence to an internal combustion chamber where the partial oxidation reaction was effected. The introduction of commercially pure oxygen into the methane stream enabled the operation to be carried out at about 300° C. higher than is possible without its use. The product contained about 0.2 percent more acetylene than was produced from a comparable amount of the same reactants under prior conditions.

In another example of the invention, steam was introduced into the methane feed line in the ratio of 500 cubic feet of methane per pound of steam (21.5 cubic feet of steam). The methane and the oxygen streams were preheated to a temperature of 750° C. and 650° C., respectively. Subsequently, the methane and the oxygen streams were passed to a mixing zone and thence to an internal combustion chamber where the partial oxidation reaction was effected. The introduction of steam into the methane stream enabled the operation to be carried out at about 250° C. higher than is possible without its use. Also, a substantial average increase of about 24 hours in trouble-free operation was obtained and the product contained about 0.3 percent more acetylene than was produced from a comparable amount of the same reactant under prior conditions.

In order to evaluate the upper ranges of inhibitor which can be added to a feedstock stream without detrimental results, steam was introduced into the methane feed line in the ratio of 120 cubic feet of methane per pound of steam (21.5 cubic feet of steam). Respective preheat temperatures for the methane and oxygen streams were 750° C. and 650° C. At these conditions, viz., with an inhibitor concentration of about 18% by volume of the hydrocarbon feedstock, a slight decrease in acetylene yield was noted and the reaction tended to become unstable. It was also found that a slight increase in the oxygen/methane ratio was required to obtain the reaction desired.

In another test to evaluate the upper ranges of inhibitor, air was introduced into the methane feed line in the ratio of 5.23 cubic feet of methane per cubic foot of air. Respective preheat temperatures for the methane and oxygen streams were 750° C. and 650° C. At these conditions, viz., with an inhibitor concentration of about 19% by volume of the hydrocarbon feedstock, a slight decrease in acetylene yield was noted and a reaction between the air and the feedstock was observed in the feedstock preheater tubes.

In the foregoing examples, volumes in cubic feet are the actual metered flows referred to a basis of 14.7 pounds per square inch absolute pressure and 70° F. temperature.

It should be pointed out that the above examples are representative of operations carried out under rather adverse conditions. In the examples, if the operations were to be carried out on a 24 hours a day basis, it would be quite possible to operate at somewhat lower preheat temperatures, thereby obtaining longer trouble-free periods of operation.

While the invention has been described with reference to the use of a substantially pure methane feed stock, it is to be understood the invention is not so limited. Preignition inhibitors have been successfully employed with other hydrocarbon feed stocks such as, for example, natural gas that has not had the heavier hydrocarbons removed and a hydrocarbon feed stock consisting of: 94.9 percent $CH_4$, 0.6 percent $N_2$, 3.3 percent $C_2H_6$, 0.7 percent $C_3H_8$, 0.4 percent $CO_2$, and 0.1 percent butanes.

What is claimed is:

1. In a process for the production of acetylene by partial oxidation of a hydrocarbon feed stock consisting substantially of saturated hydrocarbon, wherein a preheated stream of said hydrocarbon feed stock heated to a temperature below the temperature at which substantial pyrolysis of said hydrocarbon feed stock occurs and a preheated conduit-contained stream of oxidant heated to a temperature below the temperature at which substantial oxidation of the conduit occurs are admixed in a mixing zone and the combined streams passed into a reaction zone wherein said partial oxidation is effected, the improvement which comprises introducing into said hydrocarbon feed stock, prior to mixing said hydrocarbon feed stock and said oxidant, a preignition inhibitor in concentration of between about 0.1 and about 20 percent by volume of the hydrocarbon feed stock, said preignition inhibitor comprising at least one member selected from the group consisting of air, oxygen, oxygen-enriched air and steam, whereby preignition of said mixture, prior to partial oxidation in said reaction zone, is diminished, and whereby higher preheat temperatures of the reactants can be employed without causing excessive preignition reactions.

2. The process in accordance with claim 1, wherein said hydrocarbon feed stock is substantially pure methane.

3. The process in accordance with claim 1, wherein said preignition inhibitor is introduced into said hydrocarbon feed stock prior to preheating said hydrocarbon feed stock.

4. In a process for the production of acetylene by partial oxidation of methane, wherein a preheated stream of methane heated to a temperature below the temperature at which substantial pyrolysis of methane occurs and a preheated conduit-contained stream of oxygen heated to a temperature below the temperature at which substantial oxidation of the conduit occurs are admixed in a mixing zone and the combined streams passed into a reaction zone wherein said partial oxidation is effected, the improvement which comprises introducing into said methane, prior to mixing said methane and said oxygen, a preignition inhibitor in concentration of between about 0.1 and about 20 percent by volume of the hydrocarbon feed stock, said preignition inhibitor comprising at least one member selected from the group consisting of air, oxygen, oxygen-enriched air and steam, whereby preignition of said mixture, prior to partial oxidation in said reaction zone, is diminished, and whereby higher preheat temperatures of the reactants can be employed without causing excessive preignition reactions.

5. The process in accordance with claim 4, wherein said preignition inhibitor is air.

6. The process in accordance with claim 4, wherein said preignition inhibitor is oxygen.

7. The process in accordance with claim 4, wherein said preignition inhibitor is steam.

8. In a process for the production of acetylene by partial oxidation of a hydrocarbon feed stock consisting substantially of saturated hydrocarbon, wherein a preheated stream of said hydrocarbon feed stock heated to a temperature below the temperature at which substantial pyrolysis of said hydrocarbon feed stock occurs and a preheated conduit-contained stream of oxidant heated to a temperature below the temperature at which substantial oxidation of the conduit occurs are admixed in a mixing zone and the combined streams passed into a reaction zone wherein said partial oxidation is effected, the improvement which comprises introducing into said hydrocarbon feed stock, prior to mixing said hydrocarbon feed stock and said oxidant, a preignition inhibitor in concentration of between about 0.1 and about 5 percent by volume of the hydrocarbon feed stock, said preignition inhibitor comprising at least one member selected from the group consisting of air, oxygen, oxygen-enriched air and steam, whereby preignition of said mixture, prior to partial oxidation in said reaction zone, is diminished, and whereby higher preheat temperatures of the reactants can be employed without causing excessive preignition reactions.

9. The process in accordance with claim 8, wherein said hydrocarbon feed stock is substantially pure methane.

10. The process in accordance with claim 8, wherein said preignition inhibitor is introduced into said hydrocarbon feed stock prior to preheating said hydrocarbon feed stock.

11. In a process for the production of acetylene by partial oxidation of methane, wherein a preheated stream of methane heated to a temperature below the temperature at which substantial pyrolysis of methane occurs and a preheated conduit-contained stream of oxygen heated to a temperature below the temperature at which substantial oxidation of the conduit occurs are admixed in a mixing zone and the combined streams passed into a reaction zone wherein said partial oxidation is effected, the improvement which comprises introducing into said methane, prior to mixing said methane and said oxygen, a preignition inhibitor in concentration of between about 0.1 and about 5 percent by volume of the hydrocarbon feed stock, said preignition inhibitor comprising at least one member selected from the group consisting of air, oxygen, oxygen-enriched air and steam, whereby preignition of said mixture, prior to partial oxidation in said reaction zone, is diminished, and whereby higher preheat temperatures of the reactants can be employed without causing excessive preignition reactions.

12. The process in accordance with claim 11, wherein said preignition inhibitor is air.

13. The process in accordance with claim 11, wherein said preignition inhibitor is oxygen.

14. The process in accordance with claim 11, wherein said preignition inhibitor is steam.

References Cited in the file of this patent

UNITED STATES PATENTS

| | | |
|---|---|---|
| 2,816,942 | Bills | Dec. 17, 1942 |
| 2,862,984 | Bartholome et al. | Dec. 2, 1958 |
| 2,884,472 | Bludworth | Apr. 28, 1959 |
| 3,062,906 | Howard | Nov. 6, 1962 |

FOREIGN PATENTS

| | | |
|---|---|---|
| 1,083,806 | Germany | June 23, 1960 |